(12) United States Patent
Gray

(10) Patent No.: US 7,292,685 B2
(45) Date of Patent: Nov. 6, 2007

(54) PRO-ACTIVE FEATURES FOR TELEPHONY

(75) Inventor: Thomas Gray, Carp (CA)

(73) Assignee: Mitel Knowledge Corporation, Ontario (CA)

( * ) Notice: Subject to any disclaimer, the term of this patent is extended or adjusted under 35 U.S.C. 154(b) by 186 days.

(21) Appl. No.: 10/310,558

(22) Filed: Dec. 5, 2002

(65) Prior Publication Data

US 2003/0108173 A1 Jun. 12, 2003

(51) Int. Cl.
*H04M 3/42* (2006.01)
*G06F 15/173* (2006.01)
*G06F 17/00* (2006.01)
*H04J 3/16* (2006.01)
*H04J 3/22* (2006.01)
*G06N 5/02* (2006.01)

(52) U.S. Cl. .................. 379/201.02; 370/466; 709/223; 706/49

(58) Field of Classification Search ........... 379/201.02, 379/188; 707/10, 101; 370/466, 238; 709/213, 709/223; 706/49
See application file for complete search history.

(56) References Cited

U.S. PATENT DOCUMENTS

| | | | |
|---|---|---|---|
| 5,197,096 A | | 3/1993 | Sakuma et al. |
| 5,963,947 A | * | 10/1999 | Ford et al. ..................... 707/10 |
| 5,974,420 A | * | 10/1999 | Lehman et al. ............. 707/101 |
| 5,987,113 A | | 11/1999 | James |
| 2002/0146097 A1 | | 10/2002 | Vuori |

FOREIGN PATENT DOCUMENTS

| | | |
|---|---|---|
| EP | 1071295 A2 | 1/2001 |
| GB | 2351870 | 1/2001 |

OTHER PUBLICATIONS

Search Report of Great Britain Application No. 9927595.0.
Office Action dated Apr. 11, 2008 from the Canadian Intellectual Property Office for a foreign counterpart application No. 2,413,574.
Kanter, "An Application Architecture for Mobile Interactive Spaces", Work-in progress presentation at the third IEE Workshop on Mobile Computing Systems and Applications (WMCSA2000), Monterey, Dec. 2000.
Buhr et al., "Feature-Interaction Visualization and Resolution in an Agent Environment", Fifth International Workshop on Feature Interactions in Telecommunications and Software Systems (FIW'98), Lund, Sweden, Oct. 1998. IOS Press, Amsterdam, pp. 135-149.

(Continued)

*Primary Examiner*—Harry S. Hong
*Assistant Examiner*—Thjuan K. Addy
(74) *Attorney, Agent, or Firm*—F. Chau & Associates, LLC

(57) ABSTRACT

A system is provided for pro-actively suggesting communication features to users, comprising a tuple space for facilitating collaboration among software agents, a plurality of device agents for controlling operation of associated communication devices for respective ones of the users, and a plurality of user agents representing a plurality of users, each of the user agents (i) facilitating creation, by a user desirous of communicating, of groups of users to be communicated with, (ii) poking tuples to the tuple space indicative of each user's availability for communication; (iii) peeking anti-tuples to the tuple space for eliciting communication availability of respective ones of the users in the groups of users to be communicated with and in response causing associated device agents to display via respective ones of the devices the aforementioned availability to the user desirous of communicating, and to effect communication between the user desirous of communicating and a selected one of the respective users who is indicated as being available for communication.

5 Claims, 2 Drawing Sheets

OTHER PUBLICATIONS

DKG Campbel, et al., "Linda for Case Base Retrival: A Case for Extending the Functionality of Linda and its Abstract Machine," pp. 226-235, 1998 IEEE Proc. 31st Annual Hawaii International Conference on Systems Sciences.

Hyong Sop Shim, et al., "An Example of Using Presence and Availabilty in an Enterprise for Spontaneous, Multiparty, Multimedia Communications," pp. 1-11, Internet Citation Apr. 3, 2001 XP-002252324.

* cited by examiner

| Doris Leafloor | Call |
| Judy Vierich | Call |
| H. Krausbar | Call |
| Nick Tsiakas | Call |
| B. Mcconnell | Call |
| Ernst Munter | Call |
| Lee Cox | Call |
| Janet Bell | Call |

PRO-ACTIVE FEATURES FOR TELEPHONY

FIELD OF THE INVENTION

This invention relates generally to communication systems such as PBXs, and more particularly to a system for pro-actively suggesting beneficial communication to a user in a communication system.

BACKGROUND OF THE INVENTION

Traditional PBX features are 'reactive' in the sense that they are triggered by user actions and take no action otherwise. Reactive features facilitate communications directed by a user. A user must take the initiative with all calls under the reactive feature model. Pro-active features, on the other hand, take the initiative and suggest communications that may be of benefit to the user.

Pro-active features are known in the art of computer science but are relatively new to the field of telephony. As discussed above, the initiation of communication has traditionally been left to the initiative of the user. Call-back is the only telephony feature that comes close to the idea of pro-active features. With Call-back, a user can ask the system to notify him/her when a busy line becomes free, and create a call between the user's telephone and the newly freed line. The system generates a special ring to the originating telephone and sets up the call upon the user going off-hook. In the context of pro-active features, the telephony Call-back feature suffers from a number of disadvantages. Firstly, the user is required to actively intervene in the process (i.e. go off-hook in response to the special ringing). Secondly, the feature accommodates only one user at a time. Lastly, the feature is temporary in the sense that it needs to be invoked by the user every time it is used, or after a daily timer expires (required to prevent confusion by removing long delayed call backs).

The inventor has recognized the desirability of a system for allowing a user to establish groups of people that he/she may wish to have voice collaboration with while working on a project or problem, pro-actively identifying a selected group based on the user's activity, and suggesting communication with available members of the group.

Currently 'buddy lists' are used on instant messaging systems like ICQ and AOL to indicate the availability status of other users that the user may wish to communicate with. These systems provide only one list per user and do not provide the capability of multiple lists or the selection of one of multiple lists depending on user needs. Thus, it is an object of an aspect of the present invention to extend the capability and enhance the usefulness of such "buddy lists" by providing the capability of selecting between lists either by direct user selection or by autonomous system action.

Busy lamp fields (BLFs) are also well-known for use in telephone systems to provide attendants with knowledge of the current busy/idle status of telephones in the system. BLFs are expensive and so are reserved for specialized attendant positions. They also indicate only the busy status of the users' telephones and not actual availability. Furthermore, BLFs show all users and the display is not in any way limited to those persons of current interest to a particular user.

SUMMARY OF THE INVENTION

According to the present invention, a system is provided for pro-actively suggesting features to a user based on information regarding the user's activities. For example, communication with available members of a user-defined group may be suggested by the system on the basis of a project or problem the user is working on. Thus, in operation the user can create a group which lists the people with whom the user is closely collaborating and with whom the user may wish to consult on a quick ad hoc basis on issues that arise out of work in progress. The user either selects a group to ascertain member availability or the system automatically selects a group based on the user's current activities (e.g. location of the user, electronic document the user is working on, etc.) Rather than consultation with a specific person, the system invites the user to consult with any available member of a group who has knowledge of what the user is working on at a particular time. Preferably, the system creates a display on the user's telephone or PC of the current availability of members of the group.

Thus, the user is not required to make a series of provisional calls to find someone that he/she can quickly consult with. Instead, the system pro-actively suggests immediate communication with available ones of his/her collaborators. This improves group activities and so improves enterprise efficiency. Improved communication is thereby facilitated within the enterprise, which encourages the forms of trust (competence, integrity and inter-personal) that are needed to allow people to cooperate in an enterprise. It has been demonstrated in sociological research that the encouragement of such trust in an organization improves both execution and innovation.

The system according to the present invention also provides services for multiple groups with which the user is collaborating. As indicated above, the user may either select a particular group or the system can suggest a group based on the user's activities, in response to which the display changes to reflect the availability of members in that group. This greatly increases the efficiency of the user in a work environment involving multiple contemporaneous projects with multiple teams. These teams or groups can be created on an ad-hoc basis since the required information is easy to enter into the system.

BRIEF DESCRIPTION OF THE DRAWINGS

A detailed description of the invention is set forth herein below, with reference to the following drawings, wherein:

FIG. 1 shows an exemplary display for indicating to a user the availability of members of a group for the purpose of communication.

DETAILED DESCRIPTION OF THE PREFERRED EMBODIMENT

Figure 2:
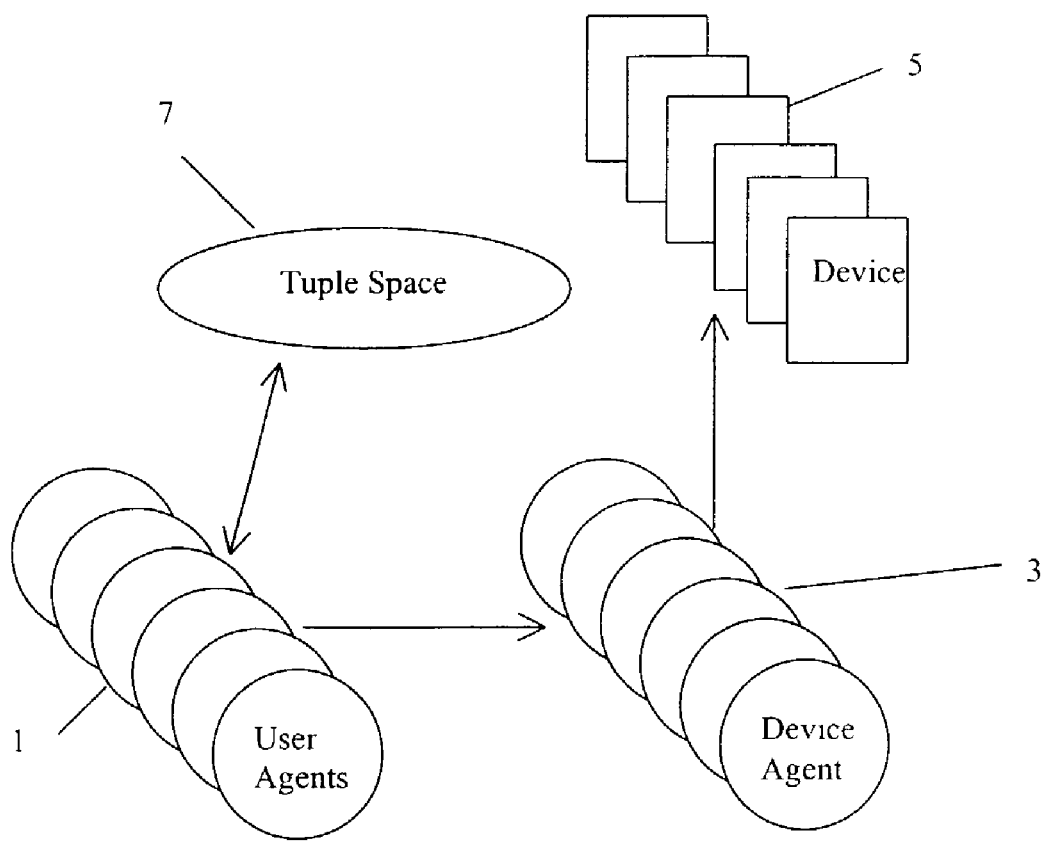
FIG. 2 is a block diagram of a system for pro-active feature suggestion, according to the preferred embodiment.

Before discussing the invention is detail, a brief introduction is set forth below of the basic structure and operation of a tuple space.

A tuple space is a set of type/value ordered pairs called ingles. Each ingle consists of a type (e.g. Name) and a value (e.g. John Doe). Thus, a tuple which describes an employee for a company could, for example, be:

{: name John Doe :age 37 :employee_number 12345 :start_date 810126 :position T12}

The tuple space enables coordination by allowing queries based on the matching of tuples by anti-tuples. An anti tuple is a tuple that can be used as a query in the tuple space. In form, it is identical to a tuple except that the value of any or all fields may be replaced by a '?' which indicates a 'don't care' condition. Tuple spaces are set up to match tuples with anti-tuples which agree in all fields except for the one(s) indicated by the ? query, which acts as a "wild card". Thus the anti tuple:

{:name ? :age 37 :employee_number ? :start_date ? :position T12} would return the tuples for all employees of position T12 who are 37 years old.

Operations on the Tuple Space Include:

Poke—place a tuple in the tuple space. Duration may be specified for how long the tuple should remain in the space. This may be any period up to indefinite.

Peek—query the tuple space with an anti-tuple. This query may be specified to last for any period up to indefinite. Copies of matching tuples are returned through the interface and the tuples remain in the tuple space.

Pick—query the tuple space with an anti-tuple. This query may be specified to last for any period up to indefinite. Copies of matching tuples are returned through the interface and the tuples are removed from the tuple space.

Cancel—with a specified anti-tuple. All matching anti-tuples are removed from the tuple space. Tuples themselves may be removed directly by an appropriate pick request.

Additional operations may be provided such as disclosed in UK Mitel Patent Application No. Mitel #520 entitled 'Tuple Space Operations for Fine Grained Control'.

FIG. 1 shows a display generated by the system according to the present invention, which can be implemented as a window in a PC display or as buttons and LEDs on a physical telephone. This display indicates the availability of members of a group that a user may be interested in having quick consultation with, and provides a button (soft or hard) by which the user is able to initiate a voice call. The boxes to the left of each name indicate availability. These boxes may be implemented in a telephone set using LEDs that are lit (marked with an 'X') when the user is available, or in a PC via a Graphical User Interface (GUI). Thus, in FIG. 1, Doris Leafloor is not available at the current moment while Judy Wierich is.

Turning to FIG. 2, a block diagram is provided of the functional components of the system according to the present invention. A plurality of user software agents 1 is provided representing each user in the system, as is well known in the art. A plurality of device agents 3 are provided for controlling operation of various devices 5 (e.g. telephones, PCs, PC phones, etc.) capable of providing communication between users and displaying user availability. Finally, a tuple space 7 provides communication services to the devices.

Each of the user agents 1 places a tuple in the tuple space to indicate the user's current availability (e.g. the user may directly communicate user availability to his/her agent or the agent may gather information from the user's current work status, calendar entries, location, etc.) The method of gathering this information is outside of the scope of the present invention but would be well understood be a person of ordinary skill in the art having regard to existing prior art such as disclosed in Ferguson and Davlouros (Ferguson, Innes A. and Davlouros, James D. 1995. PeopleFinder: A Multimodal Multimedia Communications Tool for Interconnecting Network Users. Also, the Working Notes of the IJCAI-95 Workshop on Intelligent Multimedia Information Retrieval, Montreal, PQ, August) describe a system where user location and activity is surmised from their activity (or lack thereof) on a computer network.

The tuple used to indicate the user's current availability is of the form:

| <Application> | <pro-active> | |
|---|---|---|
| <User_Name> | <Doris_Leafloof@mitel.com> | { unique user name |
| <Available> | <Yes> | { Yes or No |

Any user can create multiple groups of other users (referred to herein as 'Pro-active Feature Groups' (PFGs)) with whom he/she wishes to have periodic ad hoc communication. Each PFG is identified by a Group_Name, Project_ID and a list of unique user names. Thus, with reference to the group shown in FIG. 1, an exemplary PFG format would be:

| <Group_Name>< Switch Group> | |
|---|---|
| <Project_ID> | <X01-704-2X59-262> |
| <User> | <Doris_Leafloor@mitel.com> |
| <User> | <Judy_Weirich@mitel.com> |
| <User> | <Helmuth_Krausbar@mitel.com> |
| <User> | <Nick_Tsiakas@mitel.com> |
| <User> | <Bryan_Mcconnell@mitel.com> |
| <User> | <Ernst_Munter@mitel.com> |
| <User> | <Lee_Cox@mitel.com> |
| <User> | <Janet_Bell@mitel.com> |

Thus, the file consists of a unique name for the group, <Group_Name>, a field to indicate which project this group is associated with, <Project_ID> and unique names for the users whose availability is to be monitored <User>. In common with standard practice, an Email address format is used for the unique user name, although other formats may be used.

Once the user has programmed in various desired groups, he/she can then communicate with his/her user agent 1 to indicate which group of the programmed multiple groups he/she wishes to work with. Alternatively, the user agent 1 can suggest a group to the user based on information derived from other sources. For example, the user agent 1 may determine what project a user is working on by noting his/her physical location, the computer files he/she is using, information in his/her electronic calendar or by other pertinent information. This information can be used to relate the user's activities to a group via information contained in the <Project_ID> field of the PFG. The user agent 1 uses this information to determine which group the user wishes to communicate with.

Once a group has been selected, the user agent 1 initially determines the current status of each of the members of the group by peeking anti-tuples into the tuple space 7, where each anti-tuple is of the form:

| <Application> | <pro-active> |
|---|---|
| <User_Name> | <Doris_Leafloor@mitel.com> |
| <Available> | <?> |

The user agent 1 is then provided with information on availability of all users whose agents have registered their availability in the tuple space 7. Any user agent 1 who has not registered its user's availability is therefore deemed to be unavailable. The user agent 1 then conveys the user availability information to the user in an appropriate format (e.g. the format of FIG. 1 which includes call buttons for the user to initiate a call), such as:

```
<Button> <0>
          <User> <Doris_Leafloor@mitel.com>
          <Available> <No>
```

The associated device agent 3 uses this information to properly update the user's communication device 5 in order to display the necessary information and implement call set up, as shown in FIG. 1. The user agent periodically issues further anti-tuples to the tuple space 7 for detecting any changes in availability. Thus, as an example, in the event that the availability status of Doris Leafloor changes from unavailable to available (as a result of her user agent 1 poking the tuple space 7 with the following tuple: <Application><pro-active><User_Name><Doris_Leafloor@mitel.com><Available><Yes>), a subsequent anti-tuple will return a value which indicates her availability. Similarly, as users become unavailable, their user agents post tuples with the ingle <Available><No>, such that subsequent anti-tuples from user agents inquiring as to availability will result in such users being removed from the display of FIG. 1.

Variations and modifications of the invention are contemplated. All such alternative embodiments are believed to fall within the sphere and scope of the invention as defined by the appended claims.

What is claimed is:

1. A system for pro-actively suggesting communication features to users, comprising:
   a tuple space stored on a computer-readable media embodying instructions for facilitating collaboration among software agents;
   a plurality of device agents stored on respective computer-readable media embodying instructions for controlling operation of associated communication devices for respective ones of said users; and
   a plurality of user agents representing a plurality of users, each of said user agents stored on respective computer-readable media embodying instructions (i) facilitating creation, by a user desirous of communicating, of groups of users to be communicated with, (ii) poking tuples to said tuple space indicative of each user's availability for communication; (iii) peeking anti-tuples to said tuple space for eliciting communication availability of respective ones of said users in said groups of users to be communicated with and in response causing associated device agents to display via respective ones of said devices said availability to said user desirous of communicating, and to effect communication between said user desirous of communicating and a selected one of said respective users who is indicated as being available for communication.

2. The system of claim 1, wherein said associated device agents cause said respective devices to display a list of said respective ones of said users, an indicator of availability associated with each of said respective ones of said users, and a button associated with each of said respective ones of said users for initiating communication between said user desirous of communicating and said selected one of said respective ones of said users.

3. The system of claim 1, wherein each of said user agents automatically selects one of said user groups in connection with which said tuple space as peeked with said anti-tuples based on information relating to the current activities of the user desirous of communicating.

4. The system of claim 3, wherein said information is derived from one or more sources including at least one of location, computer files in use, project being worked on, and information in an electronic calendar of the user desirous of communicating.

5. The system of claim 4, wherein said user agent associates said information with a project name field in said group.

* * * * *